Figure 1:
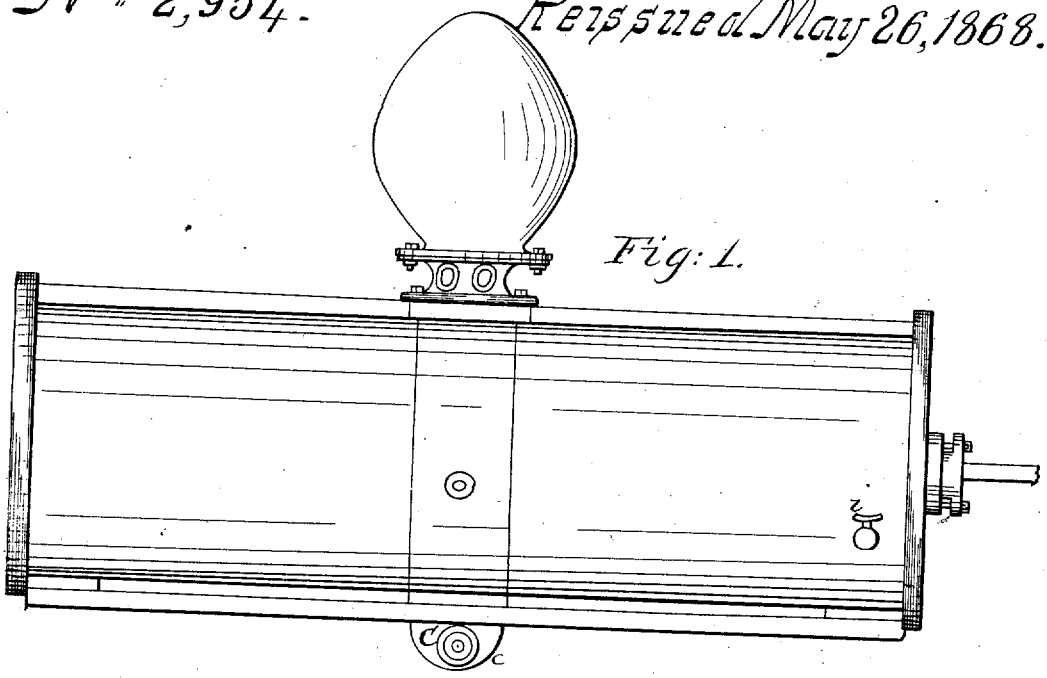

J. N. Dennisson,
Steam Fire Engine.

No. 2,954. Reissued May 26, 1868.

Witnesses.
Chas. H. Skinner
E. F. Marshall

Inventor.
J. N. Dennisson

N. PETERS, PHOTO-LITHOGRAPHER, WASHINGTON, D. C.

United States Patent Office.

THE GOULD MACHINE COMPANY, OF NEWARK, NEW JERSEY, ASSIGNEES BY MESNE ASSIGNMENTS OF JOHN N. DENNISSON, OF SAME PLACE.

*Letters Patent No.* 46,219, *dated February* 7, 1865; *reissue No.* 2,954, *dated May* 26, 1868.

IMPROVEMENT IN FIRE-ENGINES.

The Schedule referred to in these Letters Patent and making part of the same.

TO ALL WHOM IT MAY CONCERN:

Be it known that JOHN N. DENNISSON, of the city of Newark, in the county of Essex, and State of New Jersey, made certain new and useful Improvements in Relation to Fire-Engines; and we do hereby declare the following to be a full and exact description of the same, reference being had to the drawings accompanying this specificatien, and which make part of the same.

The said invention is especially applicable to steam fire-engines.

The nature of the improvement consists in regulating or varying the effective area of the pump or pumps of fire-engines, so as to obviate the difficulties now experienced, contingent upon the number of streams used, and the varied distances fire-engines have to be placed from a fire to procure the needed supply of water.

The relative areas of the steam-cylinders and the pumps attached to fire-engines, as heretofore constructed, are unchangeable, and remain the same under all circumstances; but in view of the variable demands upon them when working at fires, some means of varying their relative proportions is a great desideratum.

Water, when forced through one thousand feet of two and three-quarter hose, and through a one and one-eighth nozzle, requires a pressure of two hundred pounds on the water at the pump to give forty-five pounds at the nozzle, while a pressure of one hundred pounds on the water at pump, forced through four hundred feet of two and three-quarter hose, and through a one and one-eighth nozzle, will give the same pressure at nozzle, namely, forty-five pounds.

Therefore, a steam-cylinder and pump, proportioned so as to give forty-five pounds' pressure on the water at the nozzle, when forced through one thousand feet of hose, can work double the area of pump when forcing water through four hundred feet of hose, and throw two streams of the same size without increasing the speed of the engine, and will give the same pressure at the nozzle as when one stream is forced through one thousand feet, namely, forty-five pounds. To adapt the engine to work to the best advantage under the various conditions above alluded to, the pump or pumps, under the said DENNISSON'S invention, are so made that the effective area of their pistons can be changed, so as to deliver a larger or smaller quantity of water with a given motion of the steam-piston.

To enable others skilled in the art to which the invention appertains to fully understand and use the same, we will proceed to describe a way of carrying it into effect.

In the accompanying drawings—

Figure 1 represents a side elevation, and

Figure 2:
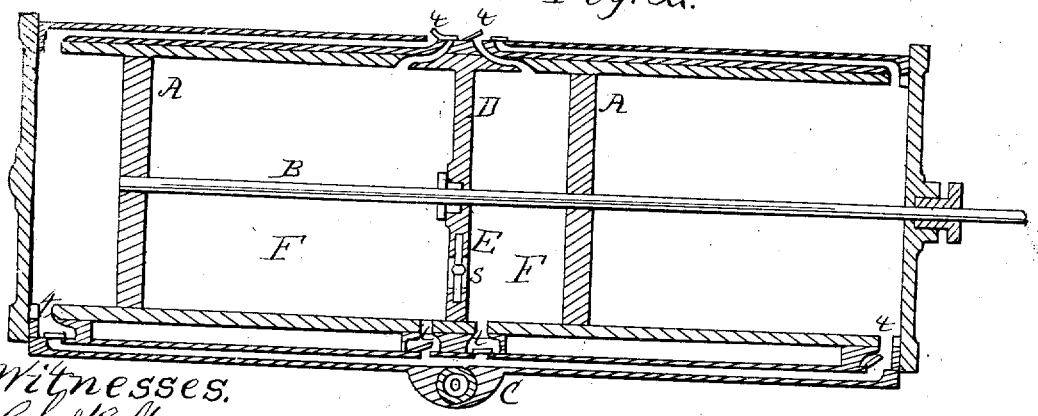

Figure 2 a vertical longitudinal section of two double-acting pumps, illustrating the said invention.

The cylinder and pumps are so proportioned that the using of one pump only, or one half of each pump, will give the necessary supply and pressure for forcing a single stream through one thousand feet of hose, and the use of the whole of both pumps will give an adequate supply and pressure to throw two such streams, when using four hundred feet of hose. The change is effected by opening or closing the valve between the two pumps, thereby halving or doubling the working-area of the pumps.

The two pistons, A A, are attached to the one piston-rod, B. The water enters by the induction-passage C, and passes out at the valve T. In the partition D, between the pumps, is shown a slide-valve, E, and an opening, S, by means of which water can pass alternately from the one to the other with the stroke of the pistons, without receiving or discharging water, thus entirely neutralizing the action of one half of each double-acting pump, if so required, and increasing or diminishing the quantity of water thrown at a stroke as the various circumstances may require, such as the number of streams thrown or the length of hose used, thus overcoming the difficulties above mentioned by working a part or the whole of the pumps.

By opening an air-cock placed between the upper and lower valves, (as at P,) the pump will be caused to discharge its water, and then take in air, preventing the operation of that part of the pump; or by placing a cock or valve in the induction-pipe or passage C, between the pumps, the same results will be accomplished, as it cuts off the supply of one of the pumps, although it will not answer the purpose as well, as it is liable to leak, let in the air, and also labor under a vacuum, or, if the whole of one pump is cut off, the pump itself becomes heated from the friction of the piston.

The following is what we claim as new in the invention of the said JOHN N. DENNISSON:

1. A force-pump, which may be adapted to throw a larger or smaller quantity of water at each stroke, by varying the effective area of its piston-surface, by means substantially as herein set forth.

2. A force-pump, provided with one or more ports or passages, the opening of which will relieve a part of the piston-surface from labor or pressure on the water, so that the whole power of the motor can be applied to the water delivered from the pump by the operative part of the piston, substantially as described.

3. Increasing or diminishing the effective area of the pump or pumps by means of a valve placed in the partition between them, so that the quantity of water discharged at a stroke can be increased or diminished at pleasure, without altering the speed or stroke, substantially as described.

GOULD MACHINE COMPANY, [L. S.]
By FRANK H. GOULD, *President.*

Witnesses:
R. J. GOULD,
C. HALSEY CANFIELD.